US012596861B2

(12) United States Patent　　　　(10) Patent No.:　　US 12,596,861 B2
Keller et al.　　　　　　　　　　　　(45) Date of Patent:　　　　Apr. 7, 2026

(54) EFFICIENT DELAY CALCULATIONS IN REPLICATED DESIGNS

(71) Applicant: Cadence Design Systems, Inc., San Jose, CA (US)

(72) Inventors: Igor Keller, Pleasanton, CA (US); Nikita Sergeev, Cork (IL); Pradeep Yadav, Gautam Buddh Nagar (IN); Maksim Baranov, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 700 days.

(21) Appl. No.: 17/978,002

(22) Filed: Oct. 31, 2022

(65) Prior Publication Data

US 2024/0143877 A1　　May 2, 2024

(51) Int. Cl.
*G06F 30/3312*　　　(2020.01)
*G06F 30/31*　　　　(2020.01)
*G06F 119/12*　　　 (2020.01)

(52) U.S. Cl.
CPC .......... *G06F 30/3312* (2020.01); *G06F 30/31* (2020.01); *G06F 2119/12* (2020.01)

(58) Field of Classification Search
CPC .................................................. G06F 30/3312
USPC ......................................................... 716/108
See application file for complete search history.

(56) References Cited

U.S. PATENT DOCUMENTS

| | | | |
|---|---|---|---|
| 5,638,291 A | 6/1997 | Li et al. | |
| 5,974,245 A | 10/1999 | Li et al. | |
| 6,223,334 B1 | 4/2001 | Suaris et al. | |
| 6,836,753 B1 | 12/2004 | Silve | |
| 7,073,149 B2 | 7/2006 | Knol et al. | |
| 7,117,473 B1 | 10/2006 | Knol et al. | |
| 7,814,451 B2 | 10/2010 | Furnish et al. | |
| 8,788,995 B1 | 7/2014 | Kumar et al. | |
| 8,863,052 B1 | 10/2014 | Dhuria et al. | |
| 9,529,962 B1 * | 12/2016 | Dhuria .................... | G06F 30/30 |
| 2014/0040843 A1 | 2/2014 | Postman et al. | |

OTHER PUBLICATIONS

Das, et al., "A Low Cost Approach for Detecting, Locating, and Avoiding Interconnect Faults in FPGA-Based Reconfigurable Systems," Jan. 1999, IEEE Twelfth International Conference on VSLI Design, Proceedings pp. 266-269.
Karasalo et al., "The Design of Control—A New System for Data Analysis," 1986, Swedish National Defense Research Institute, SSDBM, Research Report, pp. 224-244.

* cited by examiner

*Primary Examiner* — Eric D Lee
(74) *Attorney, Agent, or Firm* — Vista IP Law Group, LLP

(57)　　　　ABSTRACT

Disclosed is an improved approach to implement sharing of delay calculations for replicated portions of a design, where input slews may be different between those replicated design portions. This allows the system to experience runtime improvements for timing analysis of electronic designs.

20 Claims, 12 Drawing Sheets

Identify nodes for graph 702

Identify edges for graph 704

Process input nodes 706

Calculate output nets 708

EFFICIENT DELAY CALCULATIONS IN REPLICATED DESIGNS

BACKGROUND

An integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes, for example, interconnections of nodes and components on the chip and includes information of circuit primitives such as transistors and diodes, their sizes and interconnections.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. After an integrated circuit designer has created the physical design of the circuit, the integrated circuit designer then verifies and optimizes the design using a set of EDA testing and analysis tools.

Rapid developments in the technology and equipment used to manufacture semiconductor ICs have allowed electronics manufacturers to create smaller and more densely packed chips in which the IC components, such as wires, are located very close together. When electrical components are spaced close together, the electrical characteristics or operation of one component may affect the electrical characteristics or operation of its neighboring components, which may negatively affect the timing characteristics of the circuit design. Therefore, one of the key steps in the modern circuit design process is to perform "timing closure" and/or "signoff", to ensure that the timing characteristics of the circuit design will meet expected operating requirements.

As electronic designs move towards lower process technologies having a significantly higher number of components within the design, the process to perform timing closure has become quite challenging. The process of performing timing closure typically also includes the calculation of delays for the design, where these delay calculations are often very expensive in terms of computational resources and time. As such, it is very desirable to be able to reduce the amount of resources and time needed to perform delay calculations for the design.

One possible approach to make the timing analysis process more efficient is to share delay calculations for portions of the design that are repeated over and over again within the design. In a hierarchical design, it is likely that the same design portions (e.g., design "blocks" or "instances") are replicated many times within the hierarchical structure of the design. By sharing the delay calculations, this allows the system to avoid the cost and expense of having to separately perform the delay calculations for each of the same replicated design portions that are repeated throughout the design. However, while theoretically a good idea, it is unfortunately the case that conventional timing analysis techniques are unable to effectively and efficiently share delay calculations across many of the replicated design blocks within an electronic design given the fact that many of these replicated design blocks have different input slews. To explain, consider that the input slews to the replicated design blocks implemented within the design realistically may be different from one another. This situation may occur for example, if a first copy of a replicated design block is inserted inline with a second copy of the same replicated design block, which means that the input slew for the first copy is likely going to be quite different from the input slew for the second copy. This difference in input slews makes conventional timing analysis techniques unable to share delay calculations between these affected copies of the replicated blocks in the design.

Therefore, there is a need for an improved approach to implement sharing of delay calculations for electronic designs.

SUMMARY

According to some embodiments of the invention, the present disclosure provides an improved approach to implement sharing of delay calculations for replicated portions of a design, even where input slews may be different between those replicated design portions.

Other and additional objects, features, and advantages of the invention are described in the detailed description, figures, and claims.

BRIEF DESCRIPTION OF FIGURES

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Some embodiments of the invention provide an improved approach to implement sharing of delay calculations for replicated portions of a design, even where input slews may be different between those replicated design portions.

Figure 1:
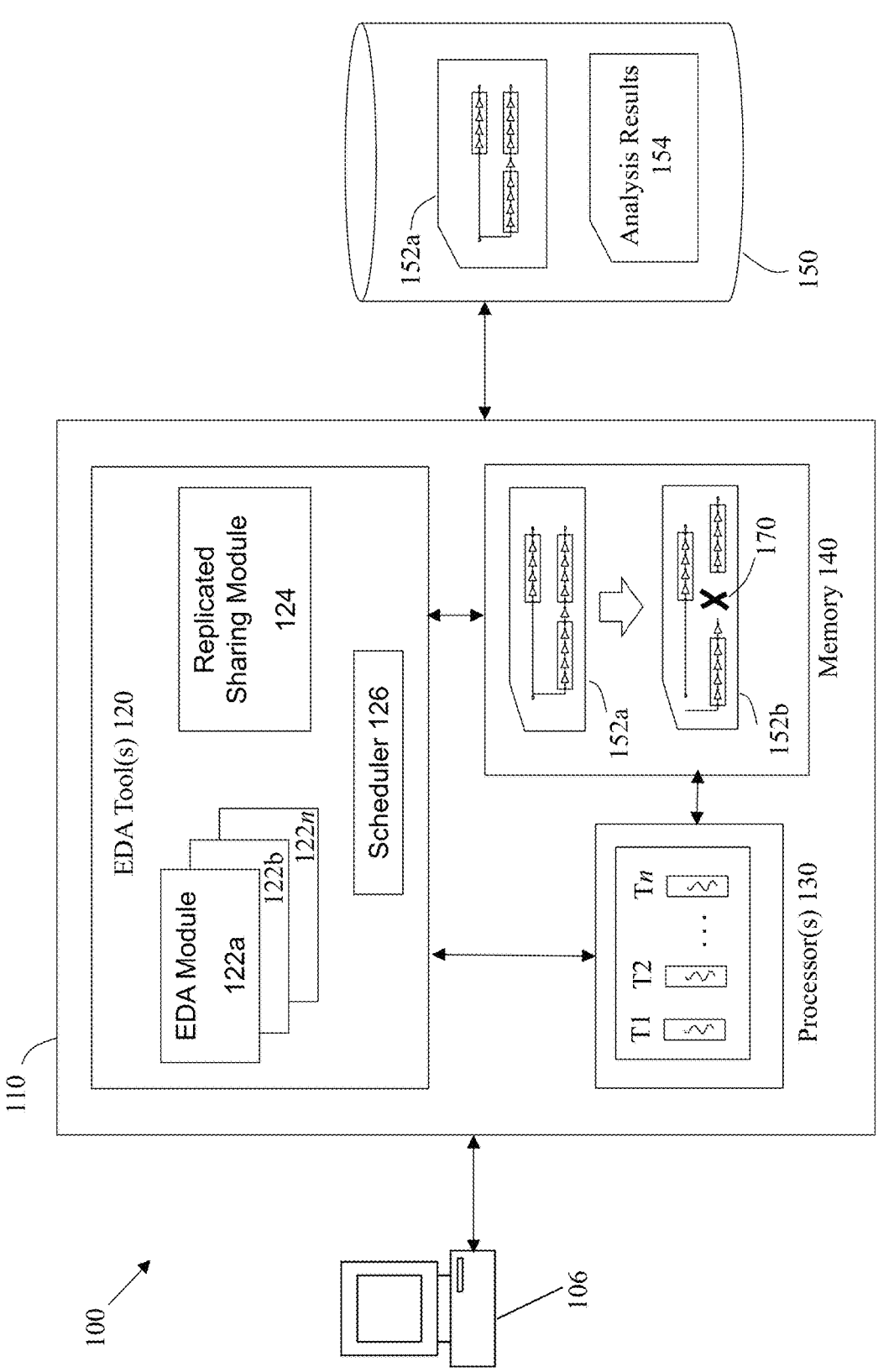
FIG. 1 provides a high level illustration of a system to implement some embodiments of the invention.

FIG. 1 provides a high level illustration of a system 100 to implement some embodiments of the invention. System 100 may include one or more users at one or more user station(s) 106 that operate the system 100 to design or verify the electronic design 152a. Such users include, for example, design engineers or verification engineers. User station 106 comprises any type of computing station that may be used to operate, interface with, or implement EDA applications or devices, such as EDA (electronic design automation) tools 120 within computing system 110. Examples of user stations 106 include for example, workstations, personal computers, or remote computing terminals. User station 106 comprises a display device, such as a display monitor, for displaying electronic design analysis results to users at the user station 106. User station 106 also comprises one or more input devices for the user to provide operational control over the activities of system 100, such as a mouse or keyboard to manipulate a pointing object in a graphical user interface. The computing system 110 comprises any suitable type of platform or system that is capable of performing computing activities within a system 100. For example, computing system 110 may be implemented as a personal computer, a workstation or a computing server. Computing system 110 may be located at any suitable location, such as for example, in the form of a portable computing device, a workstation, a server within an on-premises server room, or as a cloud-accessible server within a cloud computing environment.

The electronic design 152a may be stored in a computer readable storage device 150. The electronic design 152a corresponds to any form of electrical design data that needs to be analyzed by the EDA tool(s) 120. For example, electronic design 152a may include data in the form of view definitions, MMMC (multi-mode multi-corner) configurations, timing properties, Verilog data, LEF/DEF (Library Exchange Format/Design Exchange Format) data files, and/ or scripts. Computer readable storage device 150 includes any combination of hardware and/or software that allows for ready access to the data that is located at the computer readable storage device 150. For example, computer readable storage device 150 could be implemented as computer memory operatively managed by an operating system. The computer readable storage device 150 could also be implemented as an electronic database system having storage on persistent and/or non-persistent storage, e.g., which implements a database according to the specification, API (Applications Programming Interface), and standards compliant with the OpenAccess database reference promulgated by the Silicon Integration Initiative.

One or more EDA tools 120 may be used by users at a user station 106 to design and/or analyze the electronic design data 152a and to perform timing signoff and optimization upon that design data. EDA tools 120 may include multiple EDA modules 122a-n to perform various EDA-related functions relative to the electronic design 152a, such as design and verification activities, e.g., to perform timing analysis functions.

Static timing analysis ("STA") is one particular approach that is often used to assess the timing of any given digital circuit using software techniques and certain models that provide relevant characteristics of the digital circuit. Some of these input models may include netlists, library models, parasitic models, timing derates, standard delay format, system level constraints, delay calculation ("DC"), worst slack, timing reports, and MMMC analysis.

A "netlist" may refer to a model that defines the digital circuit that is being envisioned. Generally, a gate level netlist is provided as an input model to define the desired functionality. Various kinds of library models are required to perform static timing analysis. Some standard library models include Liberty format specified (".lib") library models for defining the delays of standard digital gates (e.g., AND OR, NOT, FLOP, LATCH, etc.) and MACROS, advanced on-chip variation ("AOCV") models for performing advanced STA, models for performing SI analysis, etc. Similar to gates, for interconnects, there exist parasitic models which are generally specified in the standard parasitic exchange format ("SPEF"). Timing Derates may be used to model the variation impact generally during STA. Standard delay format is another approach which may be used to specify the input delays of gates and interconnects. System level constraints may refer to a set of input constraints that may be applied that define the desired timing that is envisioned from the digital circuit under consideration. After reading inputs, the first step that may occur is delay calculation. During this step, an STA tool receives the user inputs provided through SPEF/Library/Timing Constraints for each netlist object and generates the best and worst propagation delay of the signal flowing through each particular stage in the design. After the delay calculation step, the STA tool may calculate the worst slack of the design. The worst slack represents the timing state of the design. It generally refers to the amount of time by which the design is meeting or violating the timing requirements specified by the user. Using the delays computed at the delay calculation step, the timing tool may internally create a timing graph for the given netlist and then propagate the worst signal across each node of the timing graph. This worst signal is the arrival time needed by the signal to reach that particular node. The arrival time reaching at each sequential register may then be compared with the design clock to ensure if the signals could reach the capturing registers in stipulated clock period or not. If yes, then the design is considered to be compliant from a timing perspective; otherwise it may be reported as a timing violation. One output format of STA software is a set of timing reports that classify the entire design into various number of paths (e.g., subsections of digital circuits) and then identify if each path is meeting the set constraints.

In some implementations, timing closure and signoff corresponds to two worst corner (best and worst) analysis. Due to an increased number of process variations in lower technologies, a designer may need to signoff on various process, voltage, temperature ("PVT") conditions. Different combination of PVT may result in a large number of corners that need to be analyzed for each design. Another set of variations comes from design modes on which a particular chip is expected to run. For example, the same wireless phone chip may operate differently while receiving the call than when in stand-by mode. Each mode may be represented through a different set of input timing constraints. The same mode may again show variation across different PVT conditions. These different modes and corner runs form the MMMC setup for a designer who needs to ensure that timing is intact for each of these combinations. One possible approach involves running all of these MMMC runs into a single run, and to then generate and review the timing of each MMMC setup. However, the corners continue to increase, the delay calculation cost also keeps on increasing.

In a hierarchical design, it is likely that the same design portions (e.g., design "blocks") are replicated many times within the hierarchical structure of the design. In fact, most modern designs contain multiple instances of the same block, such as ASICs, GPUs, FPGAs, and/or multi-core CPUs. All of these repeated instances share the same SPEF (RC). The timing for these blocks maybe very close, especially when they are deeper in the block.

Figure 2A:
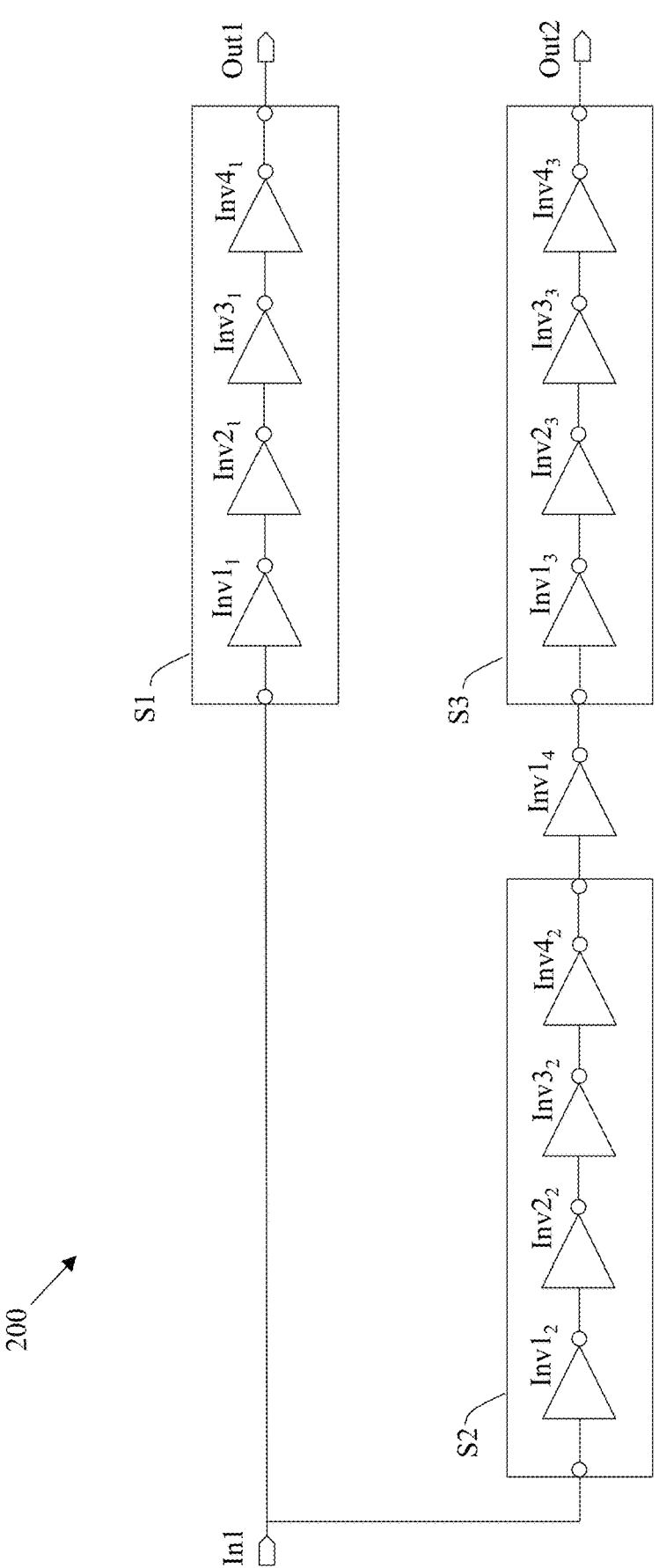
FIGS. 2A and 2B shows an example design.

To explain, consider the example design 200 shown in FIG. 2A. Here, the same block is repeated three times as blocks S1, S2, and S3. Each of these blocks include instances of the same cells within the block. For example, each of the blocks S1, S2, and S3 include the same sequence of inverters Inv1, Inv2, Inv3, and Inv4. In particular, block S1 includes inverters Inv$1_1$, Inv$2_1$, Inv$3_1$, and Inv$4_1$. Similarly, block S2 includes inverters Inv$1_2$, Inv$2_2$, Inv$3_2$, and Inv$4_2$, and block S3 includes inverters Inv$1_3$, Inv$2_3$, Inv$3_3$, and Inv$4_3$.

Figure 2B:
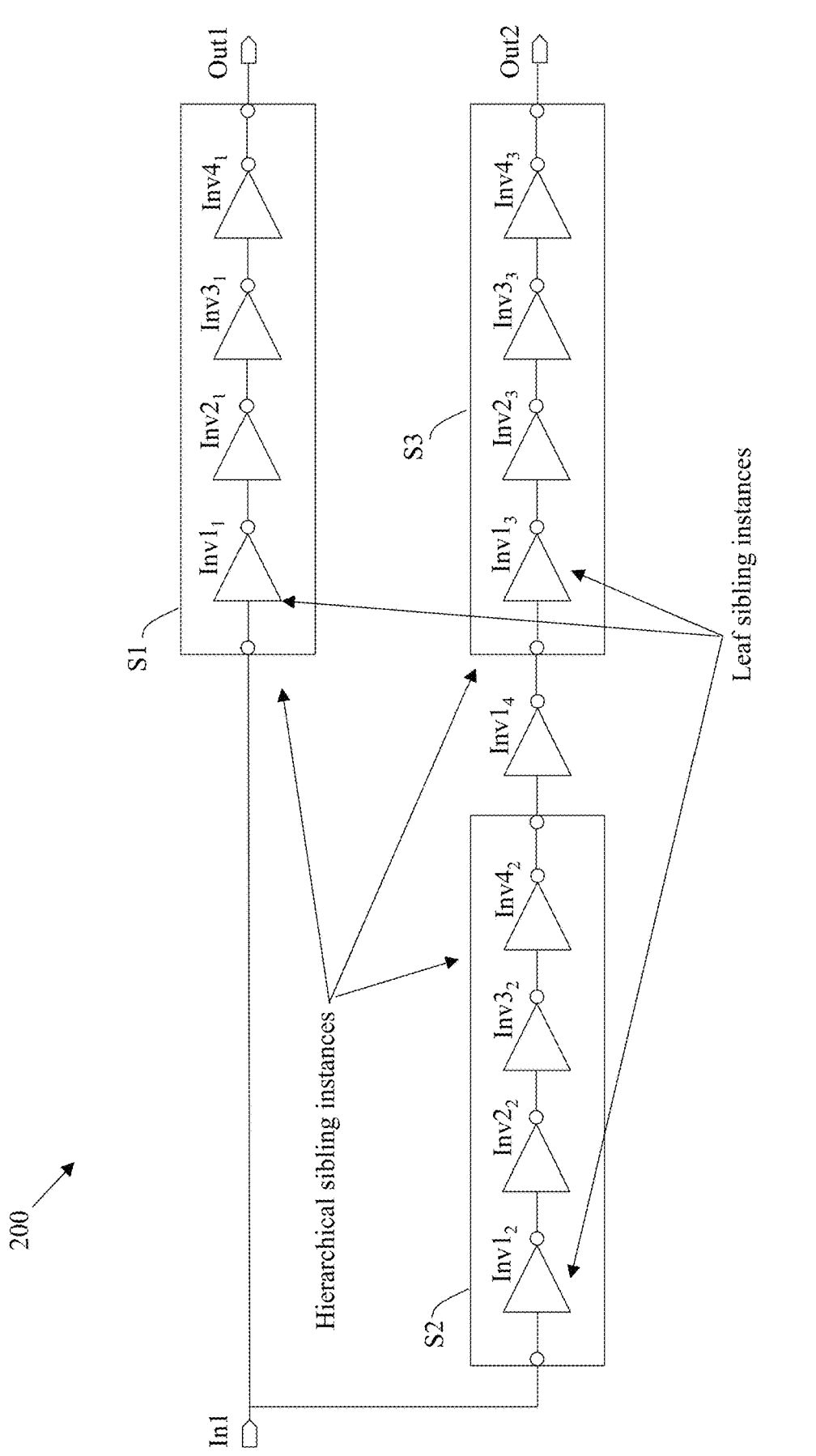

As shown in FIG. 2B, hierarchical instances of the same SPEF cell may be considered as "hierarchical sibling instances". Two leaf instances are "leaf sibling instances" if: (a) they are instances of the same cell; (b) they belong to different hierarchical sibling instances; (c) their positions inside their hierarchical instances should be the same. Terminals of two sibling instances are "sibling terminals", and nets connected to sibling terminals are "sibling nets".

It is desirable to be able to share delay calculations for portions of the design that are repeated over and over again within the electronic design. By sharing the delay calculations, this allows the system to avoid the cost and expense of having to separately perform the delay calculations for each of the same replicated design blocks that are repeated throughout the design.

However, conventional timing analysis techniques are unable to effectively and efficiently share delay calculations across many of the replicated design blocks within an electronic design if the replicated design block have different input slews. This situation may occur for example, if a first copy of a replicated design block is in the fan-in/fan-put cone of another instance of the replicated design block. In the example design of FIG. 2A, it can be seen that the design block S2 is in the fan-in cone relative to design block S3. As such, it is likely that the input slew for S2 is going to be different from the input slew for S3. This difference in input slews makes conventional timing analysis techniques unable to share delay calculations between these affected copies of the replicated blocks in the design. In addition, this also means that the exact input slew for S3 will not be known until timing calculations have been completed already for block S2.

Returning back to FIG. 1, embodiments of the invention solve this problem by implementing an improved replicated sharing module 124 that is capable of sharing delay calculations among replicated siblings, even when inputs are different between the siblings. This occurs in some embodiments breaking the dependencies (170) between the siblings to generate a modified version of the design 152*b*, and then permitting sharing on the version 152*b* of the design without the dependencies. At a later point in time, additional calculations can then be performed to reconcile and correct for the input slews.

In this way, runtime improvements can be achieved for most designs. This permits advanced STA optimization based on repeatable patterns in a design. In addition, out-of-order calculations can be performed without loss of accuracy even with inter-dependent blocks.

As a practical matter, users of the EDA systems will experience significant runtime improvements for large designs. In addition, runtime of STA will become less sensitive to the number of multi-instantiated blocks.

From a computing perspective, this approach can dramatically improve the operation and efficiency of the computing system. For example, by sharing the delay calculation across siblings, this means that delay calculations will no longer need to be performed individually for each and every instance of a repeated design portion within the design. This reduces the amount of memory 140 consumed by the system to perform the timing analysis activities. Moreover, this approach improves the real-world performance by the processor 130, since less calculations will need to be performed by the processor 130 to perform analysis over the entire design.

Some embodiments also provide a scheduler 126 that implements an improved approach to schedule computing resources to process the work for the timing analysis. In some embodiments, the scheduler 126 constructs a graph-based scheduler to process the workload, which can effectively schedule workloads for worker entities even where siblings are from different topological levels of the design. Example of worker entities which can be scheduled using scheduler 126 include, for example, threads (such as threads T1, T2, . . . Tn), processes, tasks, containers, etc.

Figure 3:
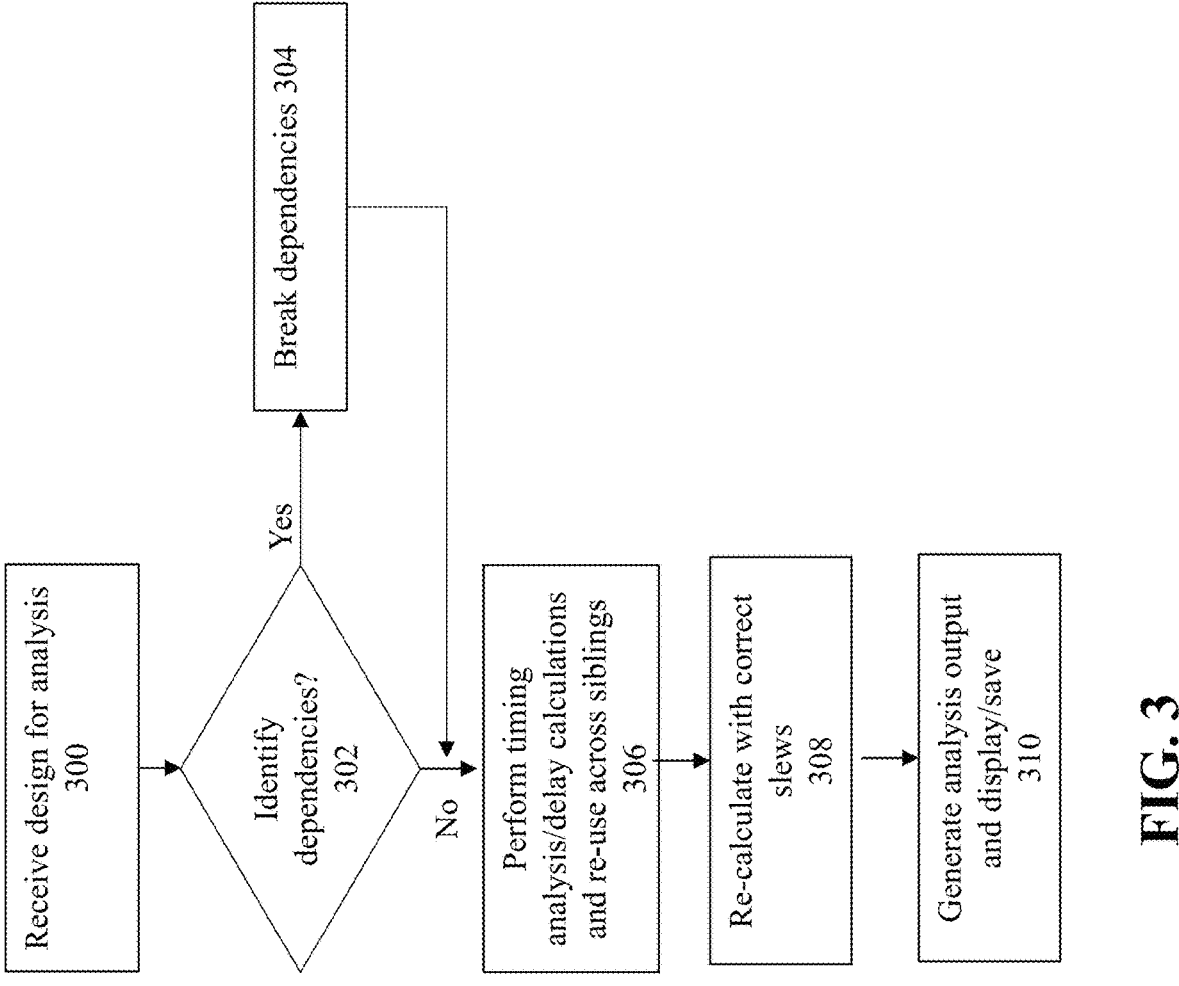
FIG. 3 shows a flowchart of some embodiments of the invention.

FIG. 3 shows a flowchart of some embodiments of the invention. At 300, an electronic design is received for analysis. For example, the design may be received to perform timing closure analysis involving a delay calculation for portions of the design. The design may refer to, but is not limited to, an integrated circuit design, or any other suitable type of electronic design, such as those associated with electronic design automation tools. For example, an electronic design may refer to a combination of hardware (e.g. described by a hardware description language) and software to implement a range of functions.

At 302, dependencies are identified for the design. If such dependencies are found, then they are broken at step 304.

Figure 6:
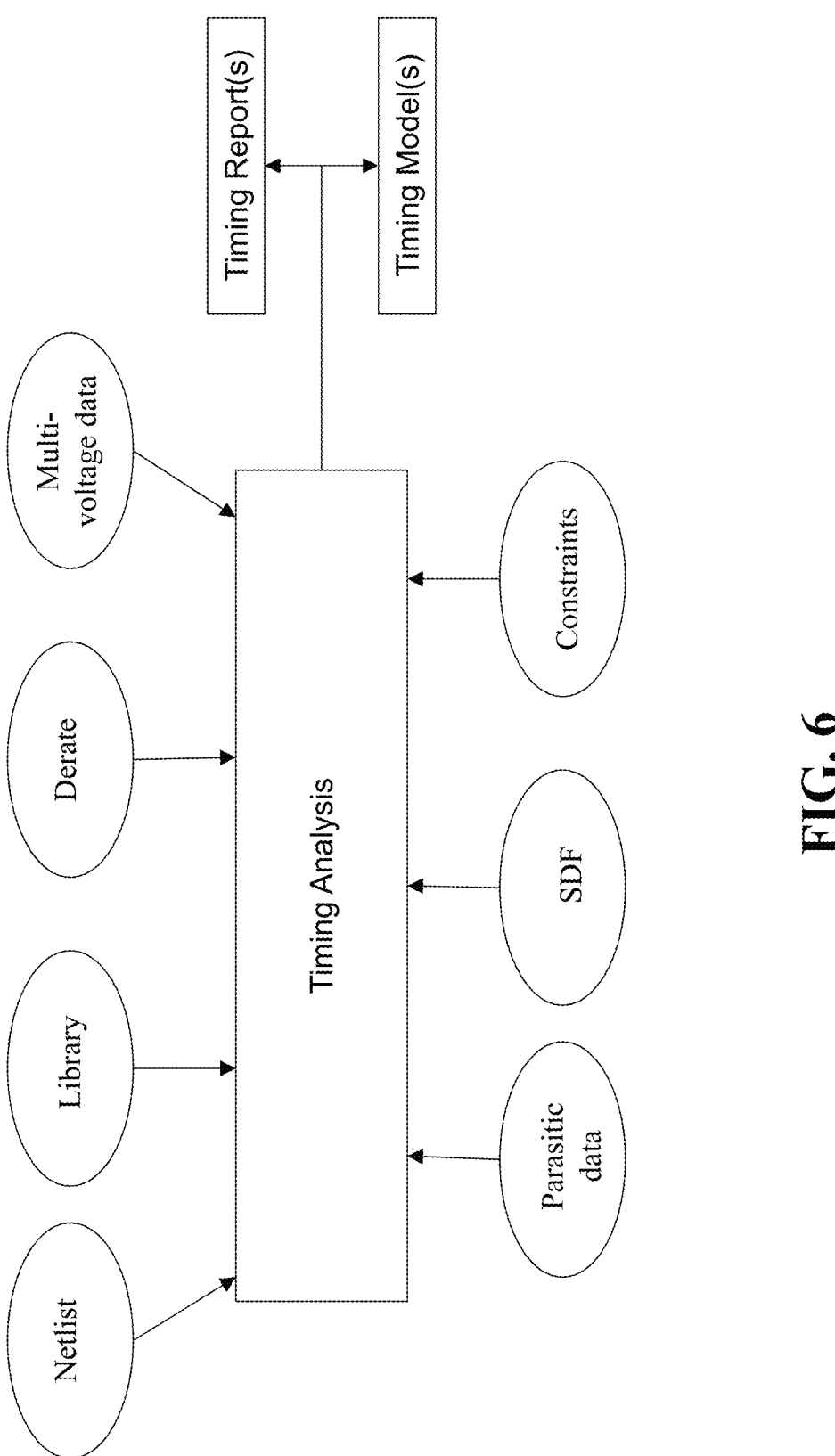
FIG. 6 shows an example of input/output flow that may be associated with static timing analysis.

At step 306, timing analysis/delay calculations may be performed, where the delay calculations are shared across siblings. Referring to FIG. 6, shown is an example of input/output flow that may be associated with static timing analysis. STA analysis may receive a number of models, some of which may include, but are not limited to, netlist, library, parasitic, SIF, constraint, multi voltage data, and timing derate models. STA may generate a number of outputs as well such as the timing reports and timing models.

With the paradigm of hierarchical designs, a full chip functionality may be hierarchically divided into different sub-functional requirements and then multiple design teams work together on modeling the specific requirements. Each hierarchical block may include its own netlist, constraints and SPEF information which may then be stitched together at the top level. If there are multiple instances of the same block, the internal constraints and SPEF may be exactly the same across all instances. The interface level netlist of these instances may be receiving different inputs that may depend upon their adjacent blocks and top level netlist/constraints. However, for accurate modeling and close correlation between blocks and chip level timing, designers typically attempt to ensure a similar set of inputs that are within a certain threshold or error tolerance. Significant replication of multiple hierarchical blocks may occur at the top level netlist. These replications may be coming from reusable sub-components shared across multiple blocks and/or due to multi-instantiation of hierarchical blocks.

The delay calculations may be performed for each of the plurality of sibling nets, even for ones where a dependency has been broken for that net. A default input slew may be utilized to perform the delay calculation. Any suitable default input slew may be used as appropriate for the specific application to which the invention is applied. In some embodiments, a default input slew of 5 picoseconds is used to perform the delay calculations.

In effect what happens is that the connections between sibling nets are broken to "pretend" that that they do not have a common path. By doing so, the system can then calculate them all together with the shared delay calculations. Therefore, a stored delay calculation ("DC") can be shared among the plurality of sibling nets. In this way, embodiments of the invention provide a significant performance enhancement for STA on hierarchical designs particularly in a C-MMMC environment as it may be configured to reduce the number of hours of STA flow runtime.

Embodiments of the system may include infrastructure to facilitate sharing of delay calculations, e.g., with respect to netlist modeling, SPEF parsing, and delay calculation operations. Netlist modeling may involve storing the sibling objects so that iteration over all the netlist sibling nodes may be performed efficiently. SPEF parsing may involve identifying and storing all of the hierarchical cells that have their own SPIT information. In some embodiments, the delay calculation may involve a preliminary step of recursive iteration over the netlist to mark SPEF siblings as well as the actual delay calculation itself, which may be configured to efficiently reuse the delay calculation across siblings.

In some embodiments, netlist level siblings may be implicitly built by building connectivity across all sibling hierarchical cells during netlist creation. This information may be stored in a searchable database and efficient iterators may be provided that can review the sibling hierarchy to access the sibling object information. Some embodiments may include a mechanism for generating SPEF level sibling information. In addition to netlist siblings, SPEF level filtered sibling information may be generated by, for example, identifying hierarchical instances of cells that have the same SPEF information.

The sharing of delay calculations may be applied to any suitable type of delay calculation technology. Some of which may include, but are not limited to, base and signal integrity "SI" for slope based delay calculation, non-linear delay modeling "NLDM", effective current source model "ECSM", and statistical on-chip variation "SOCV" The process to share delay calculations may include iterating over the siblings to check if the delay calculation has been performed for any of those sibling nets. The process may further include determining whether the DC has been performed, and if so, the process may include comparing the stage's input slew and/or constraint information with the siblings. If not, the process may include performing a typical, full stage delay calculation. If sharable, the delay calculation may be skipped for a given sibling and the delays/output slew from the sibling stage may be copied/shared.

Some embodiments may be configured to optimize slew/delay storage in the timing graph for multi-instantiated blocks. At the time of storing the slew and delays of the stage, it may be known whether the stage is going to share the delays with its sibling, as such, memory optimization may also be performed. For example, by storing the reference to the original block instead of duplicating the data this may reduce the memory requirement.

At step 308, the delay calculation for any blocks corresponding to a broken dependency undergoes a re-calculation. The reason for this step is because a default input slew value (rather than the actual input slew value) was applied in the previous steps to allow sharing of the delay calculations. As such, the result for these blocks would be incorrect. To fix this situation, re-calculations of a certain number of stages will be performed. In some embodiments, a re-calculation of approximately 2-3 stages can be performed, since in many situations this permits the slew to stabilize after the 2-3 stages. The results from the previous iterations of the block that was upstream of the breakpoint being used to perform the re-calculations.

Thereafter, at step 310, the analysis results 154 are then generated. The analysis results may be displayed to the user on a display device. Alternatively, the analysis results may be stored in the computer readable storage medium.

Figure 4:
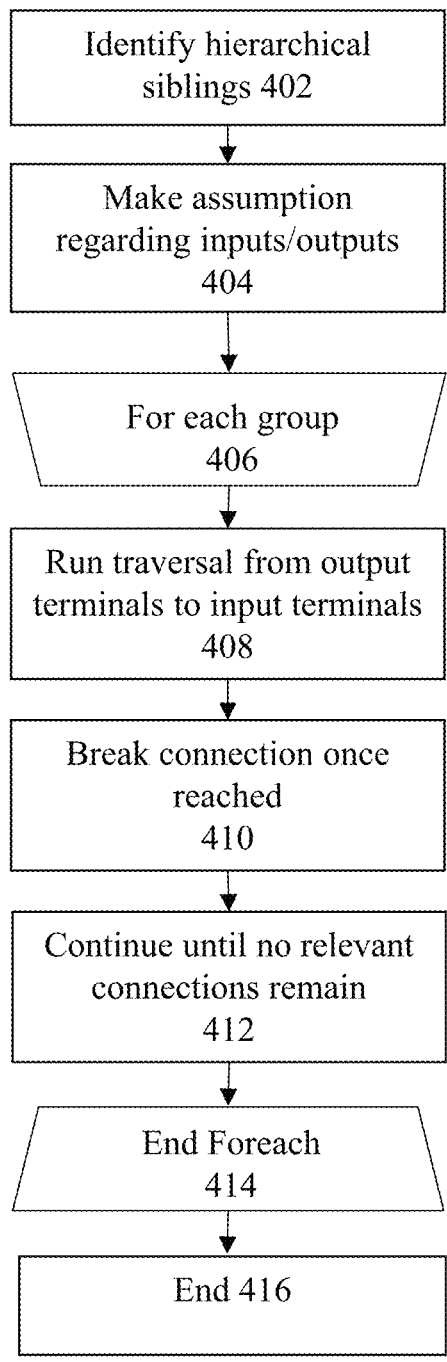
FIG. 4 shows a flowchart of an approach to implement dependency breaking according to some embodiments of the invention.

FIG. 4 shows a flowchart of an approach to implement dependency breaking according to some embodiments of the invention. At 402, the system identifies the hierarchical siblings in the design. At 404, an assumption is made regarding inputs/outputs for the hierarchical instance. In particular, an assumption is made that each hierarchical instance has the fan-in/fan-out cones for all its siblings.

Next, at 406, a set of steps will be performed for each group of hierarchical sibling instances. At step 408, a traversal is performed from all the output terminals to try and reach input terminals. At step 410, once reached, then the system will break that connection. At 412, this will continue until no connections remain between the output and input terminals. At this point, the for each loop is exited at 414. The process then ends at 416.

Figure 5A:
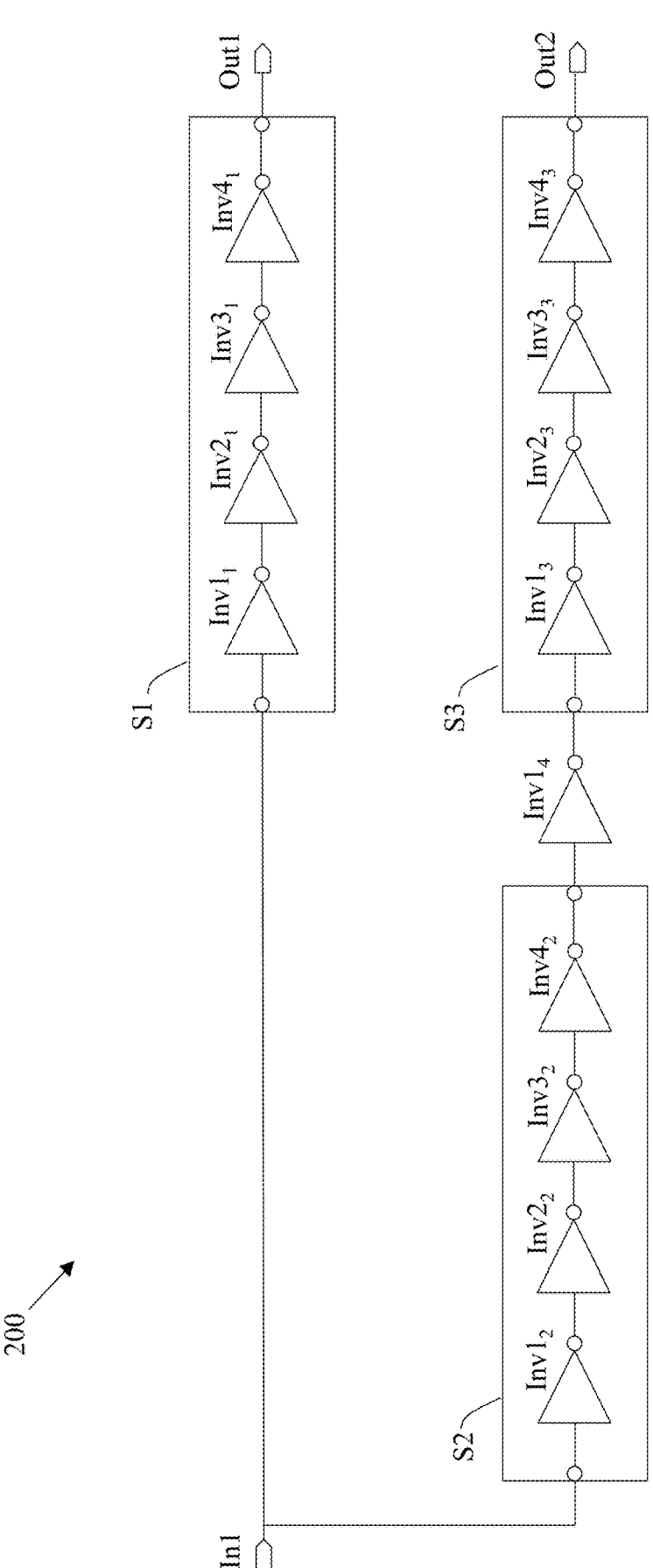
FIGS. 5A-C provide an illustration for dependency breaking.
Figure 5B:
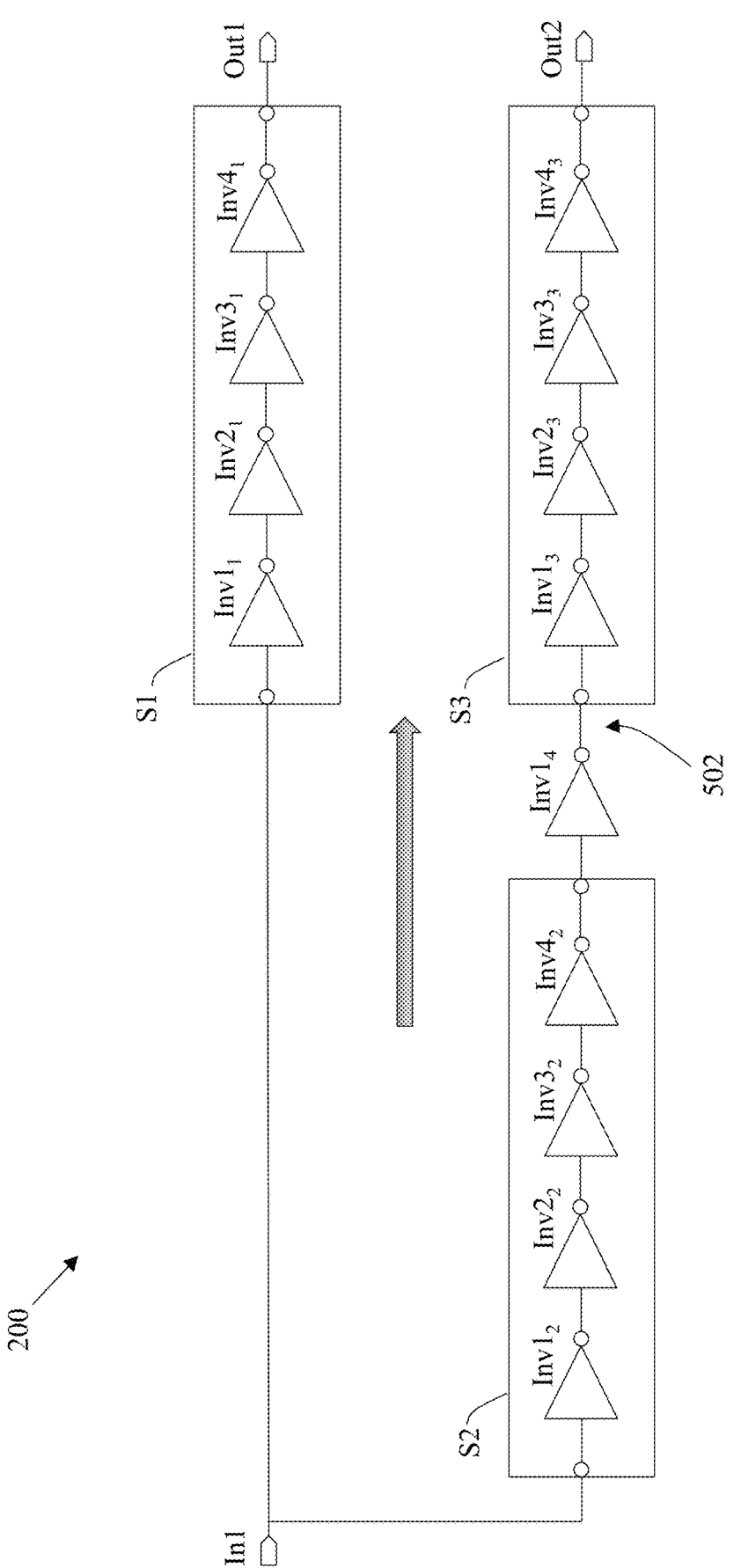
Figure 5C:
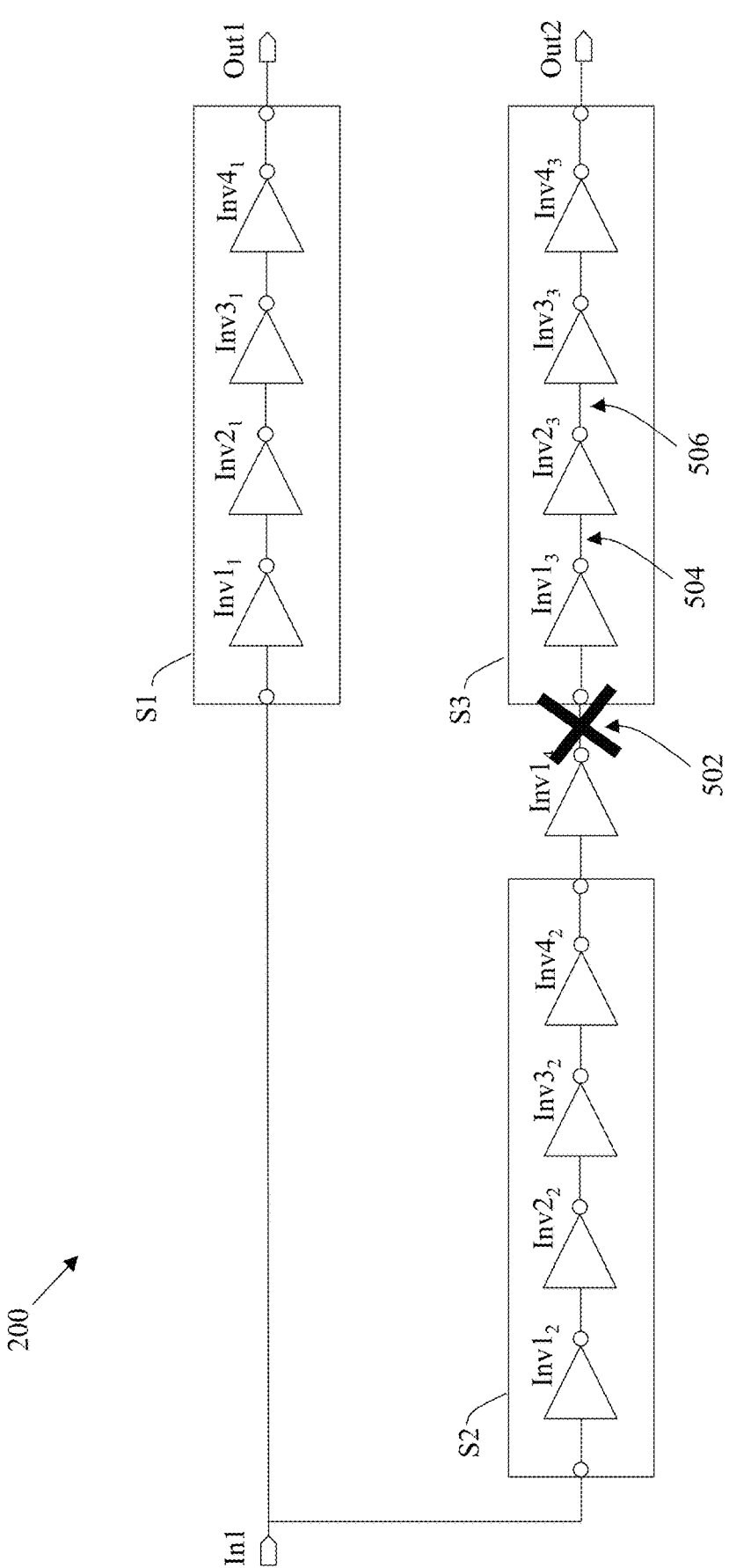

This process is illustrated in FIGS. 5A-C. FIG. 5A re-creates the example design that was previously described. FIG. 513 provides an illustration of a traversal of the terminals, showing a traversal that occur from the output terminal of block S2 to the input terminal of block S3.

As shown in FIG. 5C, upon reaching the input terminal of block S3, the connection is broken at location 502. In the current embodiment, the breakpoint is placed right at the input terminal to the block S3, after inverter $Inv1_4$. However, it is noted that the breakpoint may be inserted at any suitable location between the output of a previous block to the input of a subsequent block. For example, in the current example, the breakpoint could have alternatively been inserted between the output terminal of block S2 and the inverter 74.

Assuming that the breakpoint is inserted at location 502, then the default input slew would be imposed from that breakpoint location to perform step 306 that was described above. Thereafter, when re-calculations are performed, then more-accurate input slew values are applied, and re-calculations may be performed for nets at a number of stages from that point. For example, re-calculations may be performed in this example at two stages including nets 504 and 506. At this point, the slew should stabilize and the updated delay calculation values should be accurate. However, it is noted that the exact number of stages to re-calculate maybe adjusted depending upon the particularly application to which the invention is applied.

Some embodiments provide an improved approach to implement a scheduler for computing resources/entities within the system. The reason for using an improved scheduler is to avoid any inefficiencies when scheduling computing resources/entities (such as computing threads) to perform work for performing the delay calculations. This is because there may be many stages of workloads, with sibling instances at the different hierarchal levels that correspond to the different stages, and it is possible to unintentionally create unbalanced stages such that certain stages may over-utilize the allocated threads (too much work for threads), while other stages may under-utilize the allocated threads (not enough work for the threads).

Therefore, some embodiments provide for an improved graph-based scheduled that solves these problems. The graph-based scheduler operate efficiently even in the circumstances where siblings may be from different topological levels.

Figure 7:
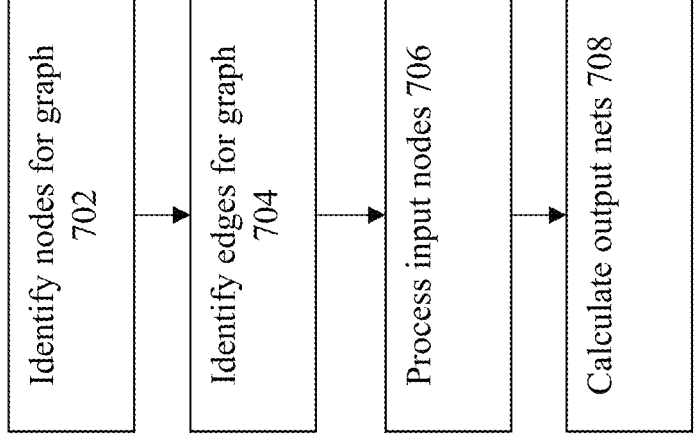
FIG. 7 shows a flowchart of an approach to implement an improved graph-based scheduler according to some embodiments of the invention.

FIG. 7 shows a flowchart of an approach to implement an improved graph-based scheduler according to some embodiments of the invention. By way of illustration, the steps in the flowchart of FIG. 7 will be described in conjunction with the graph 802 shown in FIG. 8. Graph 802 was constructed in correspondence to the design 200 shown in FIG. 2A.

Figure 8:
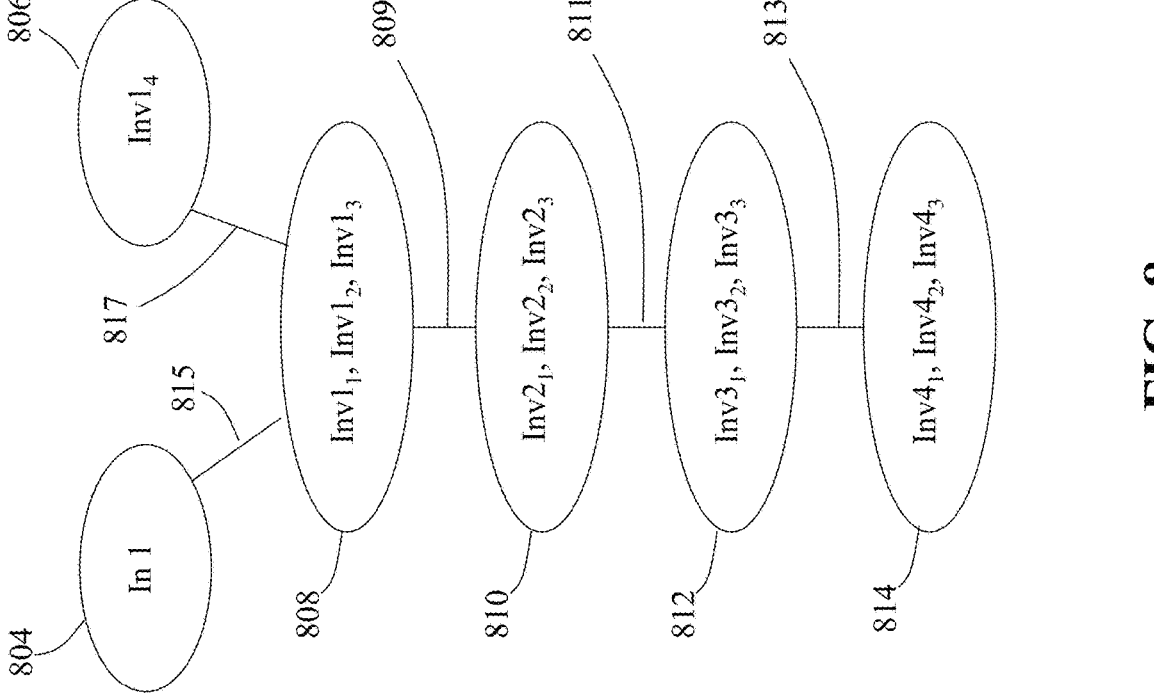
FIG. 8 provides an example graph generated by a graph-based scheduler.
Figure 8:

At 702, nodes of the graph are identified. In some embodiments, when representing a group of sibling instances, a single node is used to represent the entire group. The inputs to the instances are also represented as nodes in the graph. As shown in FIG. 8, nodes 804 and 806 correspond to inputs in the design of FIG. 2. In particular, node 804 corresponds to input In1 that pertains to the input to inverter $Inv1_1$ in blocks S1 and the input to inverter $Inv1_2$ in block S2. Node 806 corresponds to the input to inverter $Inv1_3$ in blocks S3, where this input is from inverter $Inv1_4$.

Nodes 808, 810, 812, and 814 represent groups of sibling instances in the design. In particular, node 808 represents sibling inverters $Inv1_1$, $Inv1_2$, and $Inv1_3$ in in design 200. Similarly, node 810 represents sibling inverters $Inv2_1$, $Inv2_2$, and $Inv2_3$ in in design 200, node 812 represents sibling inverters $Inv3_1$, $Inv3_2$, and $Inv3_3$ in in design 200, and node 814 represents sibling inverters $Inv4_1$, $Inv4_2$, and $Inv4_3$ in in design 200.

At 704, edges are identified within the graph. In some embodiments, the nets from the design are represented as the edges within the graph. In the current example of FIG. 8, edge 809 represents the group of nets that connect from inverts Inv1 to Inv2 in the design, edge 811 represents the group of nets that connect from inverts Inv2 to Inv3 in the design, and edge 813 represents the group of nets that connect from inverts Inv3 to Inv4 in the design. Edge 815 corresponds to the nets that connect from input In1 to inverters $Inv1_1$ and $Inv1_2$. Edge 817 corresponds to the net that connects from input from inverter $Inv1_4$ to $Inv1_3$.

At 704, the input nodes for nodes in the graph are processed. In the example of FIG. 8, this mean that the inputs nodes 804 and 806, which are input nodes for node 808, are processed. This means that the scheduler will schedule resources to process the input In1 corresponding to node 804, which is the input to the sibling inverters $Inv1_1$ and $Inv1_2$. The scheduler will also schedule resources to process the input to $Inv1_3$, which is node 806 corresponding to inverter $Inv1_4$.

Once all the input nodes are processed, at 708, the scheduler can then proceed to schedule resources to calculate output nets of instances represented by the node(s). In the example, of FIG. 8, this means that the output net corresponding to edge 809 is calculated at this point, since this output net corresponds to node 808 for which the previous processing has occurred for the input nodes 804 and 806. These actions are then repeated for the rest of the nodes in the graph until the entire graph has been processed.

Therefore, what has been described is an improved approach to implement sharing of delay calculations for replicated portions of a design, even where input slews may be different between those replicated design portions. This allows the system to experience runtime improvements can be achieved for most designs, permits advanced STA optimization based on repeatable patterns in a design, and allows for out-of-order calculations to be performed without loss of accuracy even with inter-dependent blocks. Users of the EDA systems will experience significant runtime improvements for large designs, and runtime of STA will become less sensitive to the number of multi-instantiated blocks. This approach will also improve the operation and efficiency of the computing system by reducing the amount of memory that is consumed and improving the performance of processors since less calculations will need to be performed by the processor.

System Architecture Overview

Figure 9:
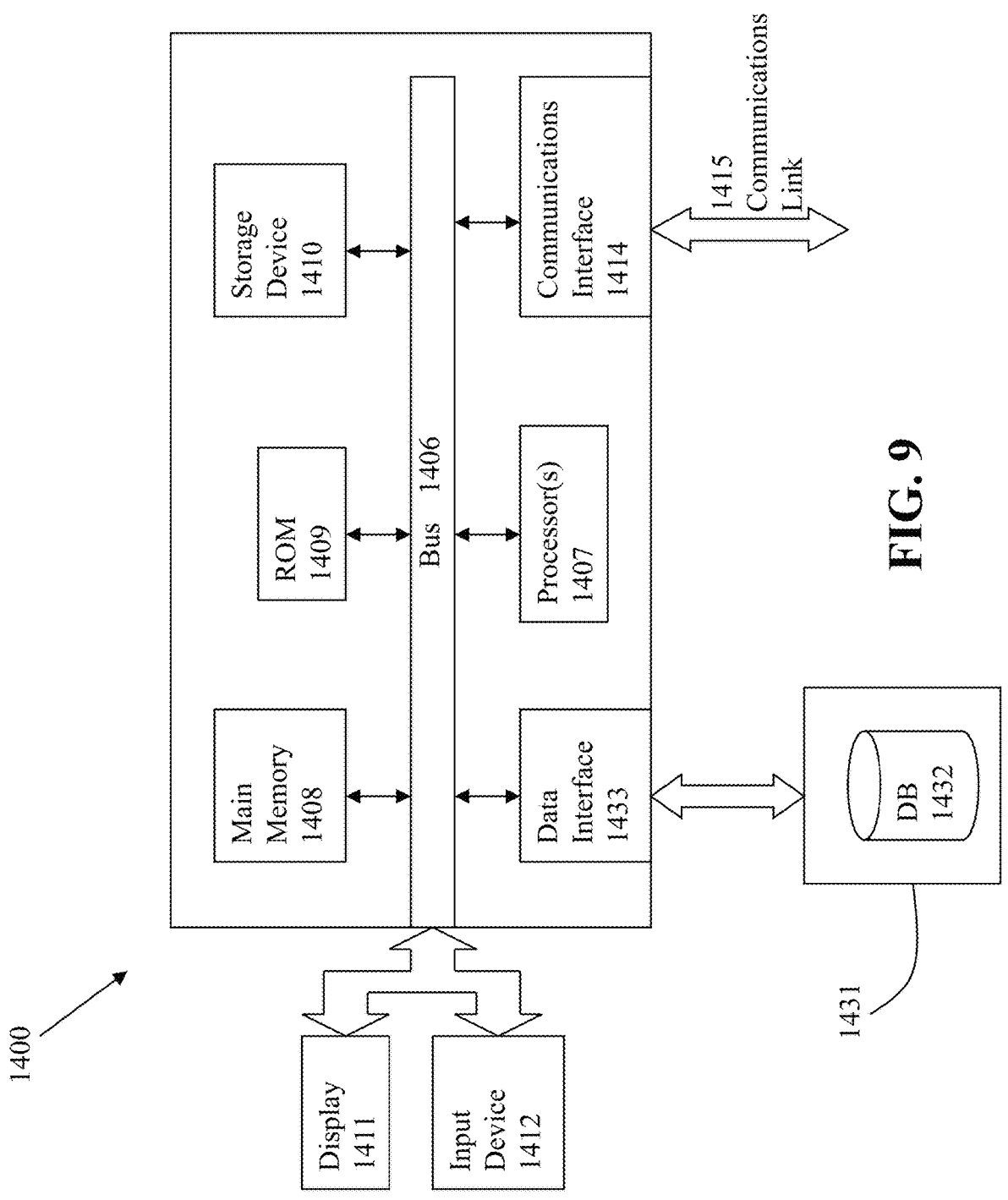
FIG. 9 shows an architecture of an example computing system with which the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another non-transitory computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408. A database 1432 may be accessed in a computer readable medium 1431 using a data interface 1433.

Common forms of non-transitory computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and any other non-transitory medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for processing an electronic design, comprising:
   receiving the electronic design;
   identifying sibling portions within the electronic design;
   identifying a dependency between a first sibling portion and a second sibling portion of the electronic design;
   breaking the dependency between the first sibling portion and the second sibling portion of the electronic design; and
   sharing a delay calculation between the first sibling portion and the second sibling portion of the electronic design.

2. The method of claim 1, wherein a default input slew is applied to the second sibling portion of the electronic design to perform timing analysis.

3. The method of claim 2, further comprising performing a re-calculation for the timing analysis with actual slew values.

4. The method of claim 3, wherein the re-calculation is performed for two or three stages of the second sibling portion.

5. The method of claim 1, wherein the dependency is broken by performing for a group of the sibling portions:
   traversing from an output terminal to an input terminal;

breaking a connection upon reaching an input terminal; and
   continuing until no connections remain.

6. The method of claim 1, wherein a graph-based scheduler is used to schedule computing resources to process the electronic design.

7. The method of claim 6, wherein the graph-based scheduler performs:
   identifying nodes for a graph, where a node corresponds to a group of sibling instances;
   identifying edges for the graph, where an edge corresponds to a net in the electronic design;
   processing an input node that provides an input to at least one node for the nodes in the graph; and
   calculating an output net for the at least one node after processing the input node.

8. A computer program product that includes a non-transitory computer readable medium, the non-transitory computer readable medium comprising a plurality of computer instructions which, when executed by a processor, cause the processor to execute performing a process for processing an electronic design, the process comprising:
   receiving the electronic design;
   identifying sibling portions within the electronic design;
   identifying a dependency between a first sibling portion and a second sibling portion of the electronic design;
   breaking the dependency between the first sibling portion and the second sibling portion of the electronic design; and
   sharing a delay calculation between the first sibling portion and the second sibling portion of the electronic design.

9. The computer program product of claim 8, wherein a default input slew is applied to the second sibling portion of the electronic design to perform timing analysis.

10. The computer program product of claim 9, further comprising performing a re-calculation for the timing analysis with actual slew values.

11. The computer program product of claim 10, wherein the re-calculation is performed for two or three stages of the second sibling portion.

12. The computer program product of claim 8, wherein the dependency is broken by performing for a group of the sibling portions:
   traversing from an output terminal to an input terminal;
   breaking a connection upon reaching an input terminal; and
   continuing until no connections remain.

13. The computer program product of claim 8, wherein a graph-based scheduler is used to schedule computing resources to process the electronic design.

14. The computer program product of claim 13, wherein the graph-based scheduler performs:
   identifying nodes for a graph, where a node corresponds to a group of sibling instances;
   identifying edges for the graph, where an edge corresponds to a net in the electronic design;
   processing an input node that provides an input to at least one node for the nodes in the graph; and
   calculating an output net for the at least one node after processing the input node.

15. A system for processing an electronic design, comprising:
   a memory comprising a storage structure to store a plurality of instructions; and
   a processor, wherein the processor is configured to execute the plurality of instructions to process the electronic design by receiving the electronic design; identifying sibling portions within the electronic design; identifying a dependency between a first sibling portion and a second sibling portion of the electronic design; breaking the dependency between the first sibling portion and the second sibling portion of the electronic design; and sharing a delay calculation between the first sibling portion and the second sibling portion of the electronic design.

16. The system of claim 15, wherein a default input slew is applied to the second sibling portion of the electronic design to perform timing analysis.

17. The system of claim 16, further comprising performing a re-calculation for the timing analysis with actual slew values.

18. The system of claim 15, wherein the dependency is broken by performing for a group of the sibling portions:
traversing from an output terminal to an input terminal;

breaking a connection upon reaching an input terminal; and
continuing until no connections remain.

19. The system of claim 15, wherein a graph-based scheduler is used to schedule computing resources to process the electronic design.

20. The system of claim 19, wherein the graph-based scheduler performs:
identifying nodes for a graph, where a node corresponds to a group of sibling instances;
identifying edges for the graph, where an edge corresponds to a net in the electronic design;
processing an input node that provides an input to at least one node for the nodes in the graph; and
calculating an output net for the at least one node after processing the input node.

* * * * *